(12) United States Patent
Coutu et al.

(10) Patent No.: US 11,913,342 B1
(45) Date of Patent: Feb. 27, 2024

(54) VARIABLE GUIDE VANE ASSEMBLY AND CONTROL SYSTEM THEREOF

(71) Applicant: PRATT & WHITNEY CANADA CORP., Longueuil (CA)

(72) Inventors: Daniel Coutu, Longueuil (CA); Pierre-Charles Payer, Hudson (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/302,441

(22) Filed: Apr. 18, 2023

(51) Int. Cl.
| | |
|---|---|
| F01D 17/14 | (2006.01) |
| F01D 17/16 | (2006.01) |
| F04D 27/02 | (2006.01) |
| F02C 9/20 | (2006.01) |
| F02C 7/042 | (2006.01) |
| F04D 27/00 | (2006.01) |

(52) U.S. Cl.
CPC .............. *F01D 17/14* (2013.01); *F01D 17/16* (2013.01); *F02C 7/042* (2013.01); *F02C 9/20* (2013.01); *F04D 27/002* (2013.01); *F04D 27/0246* (2013.01); *F05D 2270/309* (2013.01)

(58) Field of Classification Search
CPC .......... F01D 17/14; F01D 17/16; F02C 7/042; F02C 9/20; F04D 27/002; F04D 27/0246; F05D 2270/309
See application file for complete search history.

(56) References Cited

U.S. PATENT DOCUMENTS

| | | | | |
|---|---|---|---|---|
| 5,586,857 A | * | 12/1996 | Ishii | .................... F04D 27/0246 415/13 |
| 6,341,238 B1 | | 1/2002 | Modeen et al. | |
| 7,058,556 B2 | * | 6/2006 | Desai | .................... G05B 17/02 703/2 |
| 11,168,612 B2 | | 11/2021 | Tang et al. | |

FOREIGN PATENT DOCUMENTS

JP          11-257097          4/1997

* cited by examiner

*Primary Examiner* — Audrey B. Walter
(74) *Attorney, Agent, or Firm* — NORTON ROSE FULBRIGHT CANADA LLP

(57) ABSTRACT

A method of operating a variable guide vane assembly of an aircraft engine, the variable guide vane assembly including guide vanes rotatable about respective spanwise axes and circumferentially distributed about a central axis, the method comprising: obtaining a target exit flow angle defined between a direction of a flow exiting the guide vanes and the central axis; predicting an exit flow angle as a function of at least a geometric angle, the exit flow angle defined between the direction of the flow exiting the guide vanes and the central axis, the geometric angle defined between the guide vanes and the central axis; and when a difference between the exit flow angle and the target exit flow angle is above a threshold, modulating the guide vanes to modify the geometric angle until the difference between the exit flow angle and the target exit flow angle is at or below the threshold.

20 Claims, 8 Drawing Sheets

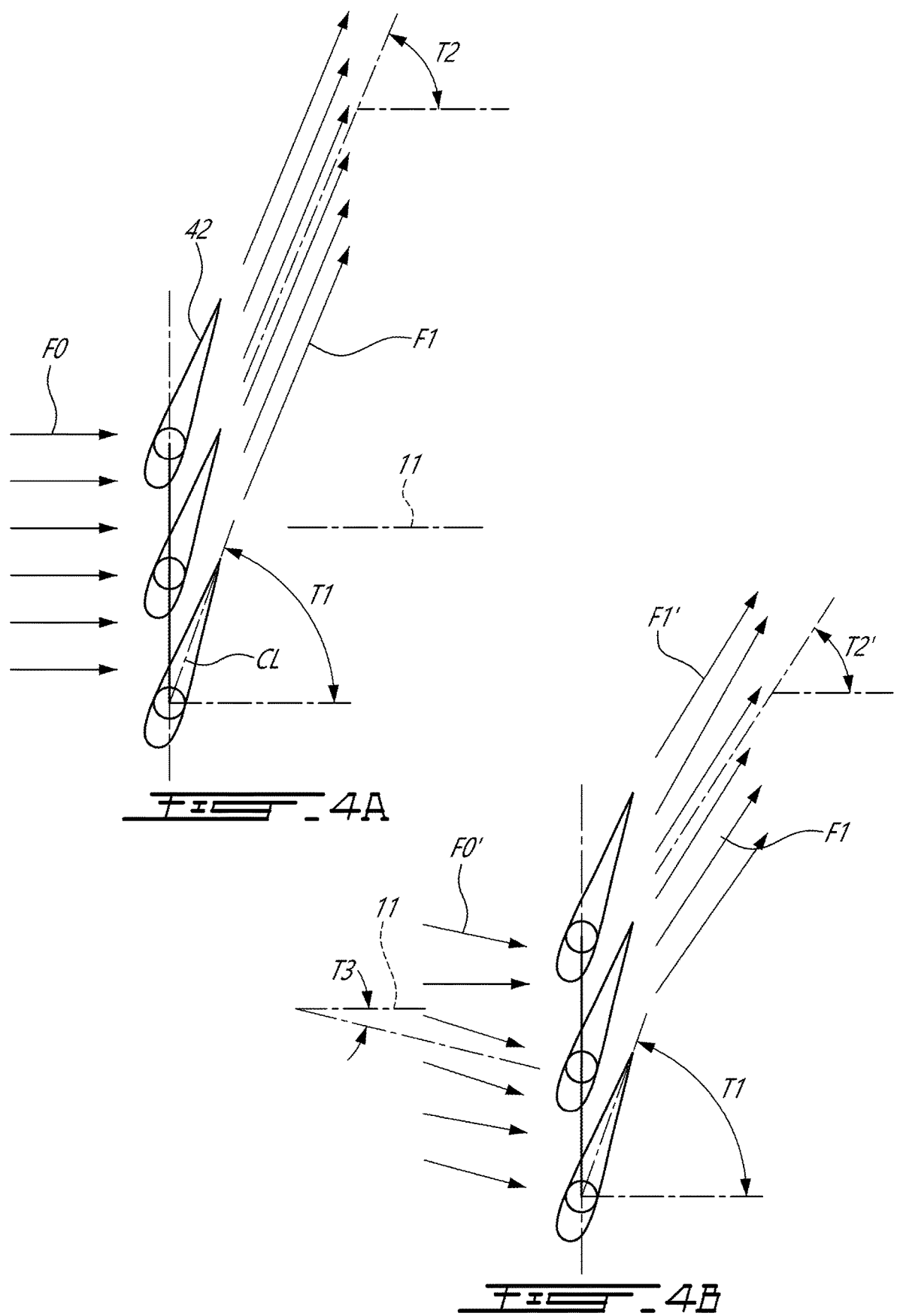

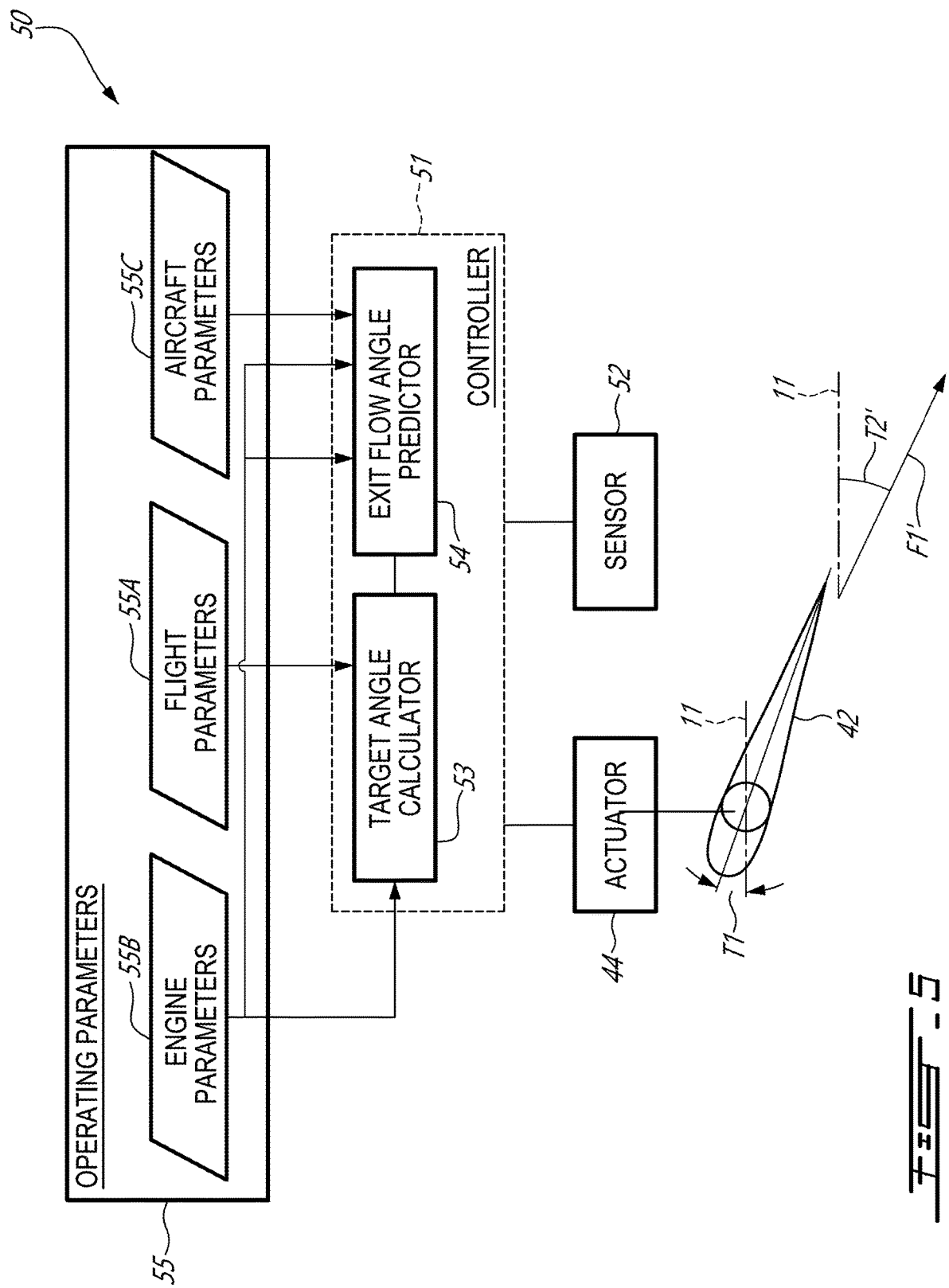

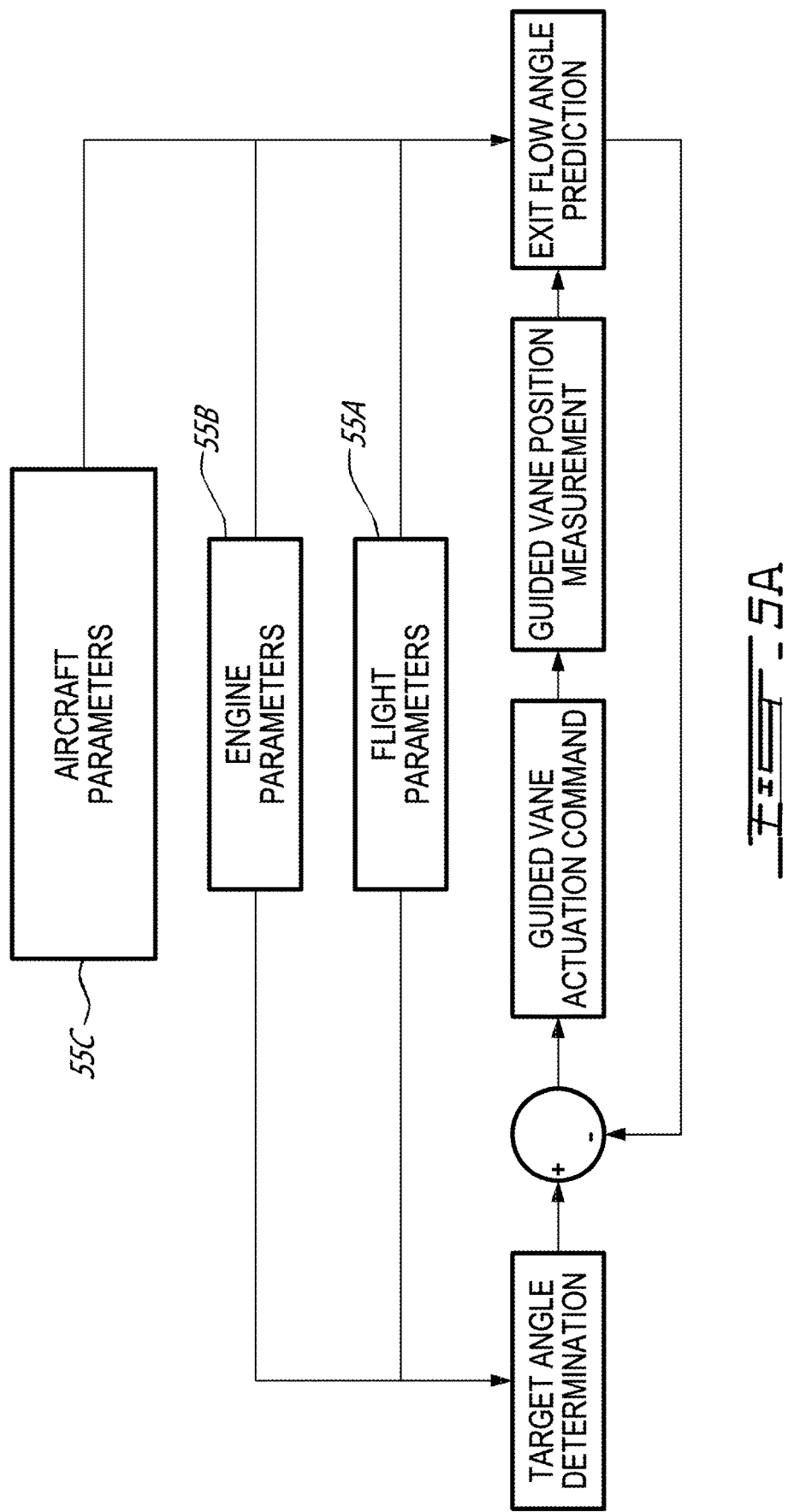

| Target exit flow angle | Operating parameters ||
| --- | --- | --- |
| | Flight parameters #1...N | Engine parameters #1...N |
| Angle value #1 | Values 1, Values 2, ... | Values 1, Values 2, ... |
| Angle value #2 | Values 1, Values 2, ... | Values 1, Values 2, ... |
| ... | ... | ... |
| Angle value #N | Values 1, Values 2, ... | Values 1, Values 2, ... |

OUTPUT / INPUT

FIG. 6A

| INPUT | INPUT | | | OUTPUT |
|---|---|---|---|---|
| Geometric angle | Operating parameters | | | Predicted exit flow angle |
| | Flight parameters #1...N | Engine parameters #1...N | Aircraft parameters #1...N | |
| Angle value #1 | Values 1, Values 2, | Values 1, Values 2, | Values 1, Values 2, | Values 1, Values 2, ... |
| Angle value #2 | Values 1, Values 2, | Values 1, Values 2, | Values 1, Values 2, | Values 1, Values 2, ... |
| ... | ... | ... | ... | ... |
| Angle value #N | Values 1, Values 2, | Values 1, Values 2, | Values 1, Values 2, | Values 1, Values 2, ... |

FIG. 6B

VARIABLE GUIDE VANE ASSEMBLY AND CONTROL SYSTEM THEREOF

TECHNICAL FIELD

The disclosure relates generally to aircraft engines, and more particularly to variable guide vane assemblies for a compressor section of an aircraft engine.

BACKGROUND

Within the compressor of an aircraft engine, such as a gas turbine engine, air is typically channeled through circumferential rows of vanes and blades that pressurize the air in stages. Variable guide vanes ("VGV" or "VGVs") are sometimes used within compressors, and provide vanes which are rotatable such that the angle of attack they define with the incoming flow may be varied. A control system adjusts an angle of the VGVs as a function of operating conditions of the engine. Improvements are sought.

SUMMARY

In one aspect, there is provided a method of operating a variable guide vane assembly of an aircraft engine, the variable guide vane assembly including guide vanes rotatable about respective spanwise axes and circumferentially distributed about a central axis, the method comprising: obtaining a target exit flow angle defined between a direction of a flow exiting the guide vanes and the central axis; predicting an exit flow angle as a function of at least a geometric angle, the exit flow angle defined between the direction of the flow exiting the guide vanes and the central axis, the geometric angle defined between the guide vanes and the central axis; and when a difference between the exit flow angle and the target exit flow angle is above a threshold, modulating the guide vanes to modify the geometric angle until the difference between the exit flow angle and the target exit flow angle is at or below the threshold.

The method defined above and described herein may also include one or more of the following features, in whole or in part, and in any combination.

In some embodiments, the predicting of the exit flow angle as a function of the at least the geometric angle includes determining the exit flow angle as a function of at least the geometric angle and as a function of operating parameters of the aircraft engine.

In some embodiments, the operating parameters include aircraft parameters including one or more of a spatial orientation of the aircraft engine, a location of the aircraft engine in relation to an aircraft equipped with the aircraft engine, and a configuration of an inlet of the aircraft engine.

In some embodiments, the operating parameters include engine parameters including one or more of a power output of the aircraft engine and a rotational speed of a shaft of the aircraft engine.

In some embodiments, the operating parameters include flight parameters including one or more of an altitude of the aircraft engine, an airspeed of the aircraft engine, and a temperature of air entering the aircraft engine.

In some embodiments, the predicting of the exit flow angle includes obtaining the exit flow angle from a lookup table correlating geometric angle values and operating parameters values with exit flow angles values.

In some embodiments, the modulating of the guide vanes to modify the geometric angle includes: a) causing rotation of the guide vanes from a first position to a second position; b) determining an updated geometric angle of the guide vanes at the second position; c) determining, based on at least the updated geometric angle of the guide vanes, an updated exit flow angle; d) repeating steps a) to c) if a difference between the target exit flow angle and the updated exit flow angle is greater than the threshold until the difference is less than the threshold.

In some embodiments, the obtaining of the target exit flow angle includes determining the target exit flow angle as a function of operating parameters of the aircraft engine.

In some embodiments, the operating parameters include one or more of engine parameters and flight parameters, the engine parameters including one or more of a power output of the aircraft engine and a rotational speed of a shaft of the aircraft engine, the flight parameters including one or more of an altitude of the aircraft engine, an airspeed of the aircraft engine, and a temperature of air entering the aircraft engine In some embodiments, the determining of the target exit flow angle includes determining the target exit flow angle from a lookup table correlating operating parameters values with target exit flow angles values.

In another aspect, there is provided an aircraft engine comprising: a variable guide vane assembly including guide vanes rotatable about respective spanwise axes and circumferentially distributed about a central axis; an actuator drivingly engaged to the guide vanes for rotating the guide vanes about the respective spanwise axes; a sensor operable to send a signal indicative of a geometric angle of the guide vanes, the geometric angle defined between the guide vanes and the central axis; and a controller operatively connected to the actuator and to the sensor, the controller having a processing unit and a computer-readable medium operatively connected to the processing unit and having instructions stored thereon configured to cause the processing unit to: obtain a target exit flow angle defined between a direction of a flow exiting the guide vanes and the central axis; predicting an exit flow angle as a function of at least a geometric angle, the exit flow angle defined between the direction of the flow exiting the guide vanes and the central axis, the geometric angle determined based on the signal from the sensor; and when a difference between the exit flow angle and the target exit flow angle is above a threshold, power the actuator to modulate the guide vanes to modify the geometric angle until the difference between the predicted exit flow angle and the target exit flow angle is at or below the threshold.

The aircraft engine defined above and described herein may also include one or more of the following features, in whole or in part, and in any combination.

In some embodiments, the instructions are configured to cause the processing unit to predict the exit flow angle as a function of the at least the geometric angle by causing the processing unit to determine the exit flow angle as a function of at least the geometric angle and as a function of operating parameters of the aircraft engine.

In some embodiments, the operating parameters include aircraft parameters including one or more of a spatial orientation of the aircraft engine, a location of the aircraft engine in relation to an aircraft equipped with the aircraft engine, and a configuration of an inlet of the aircraft engine.

In some embodiments, the operating parameters include engine parameters including one or more of a power output of the aircraft engine and a rotational speed of a shaft of the aircraft engine.

In some embodiments, the operating parameters include flight parameters including one or more of an altitude of the aircraft engine, an airspeed of the aircraft engine, and a temperature of air entering the aircraft engine.

In some embodiments, the instructions are configured to cause the processing unit to determine the exit flow angle by causing the processing unit to obtain the exit flow angle from a lookup table correlating geometric angle values and operating parameters values with exit flow angles values.

In some embodiments, the instructions are configured to cause the processing unit to the modulate the guide vanes to modify the geometric angle by causing the processing unit to: a) cause rotation of the guide vanes from a first position to a second position; b) determine an updated geometric angle of the guide vanes at the second position; c) determine, based on at least the updated geometric angle of the guide vanes, an updated exit flow angle; d) repeat steps a) to c) if a difference between the target exit flow angle and the updated exit flow angle is greater than the threshold until the difference is less than the threshold.

In some embodiments, the instructions are configured to cause the processing unit to obtain the target exit flow angle by causing the processing unit to determine the target exit flow angle as a function of operating parameters of the aircraft engine.

In some embodiments, the operating parameters include one or more of engine parameters and flight parameters, the engine parameters including one or more of a power output of the aircraft engine and a rotational speed of a shaft of the aircraft engine, the flight parameters including one or more of an altitude of the aircraft engine, an airspeed of the aircraft engine, and a temperature of air entering the aircraft engine In some embodiments, the instructions are configured to cause the processing unit to determine the target exit flow angle by causing the processing unit to determine the target exit flow angle from a lookup table correlating operating parameters values with target exit flow angles values.

BRIEF DESCRIPTION OF THE DRAWINGS

Reference is now made to the accompanying figures in which:

FIG. 4A is a top view illustrating some of guide vanes of the variable guide vane assembly of FIG. 3 with an incoming flow devoid of a swirl angle;

FIG. 4B is a top view illustrating some of the guide vanes of the variable guide vane assembly of FIG. 3 with an incoming flow comprising a swirl angle;

FIG. 5 is a schematic view of a control system for the variable guide vane assembly of FIG. 3;

FIG. 5A schematically illustrates a control loop implemented within the control system of FIG. 5;

FIG. 6A is a lookup table correlating target exit flow angle values with operating parameters values;

FIG. 6B is a lookup table correlating predicted exit flow angle values with geometric angle values and with operating parameters values;

DETAILED DESCRIPTION

The following disclosure relates generally to gas turbine engines, and more particularly to assemblies including one or more struts and variable orientation guide vanes as may be present in a compressor section of a gas turbine engine. In some embodiments, the assemblies and methods disclosed herein may promote better performance of gas turbine engines, such as by improving flow conditions in the compressor section in some operating conditions, improving the operable range of the compressor, reducing energy losses and aerodynamic loading on rotors.

Figure 1A:
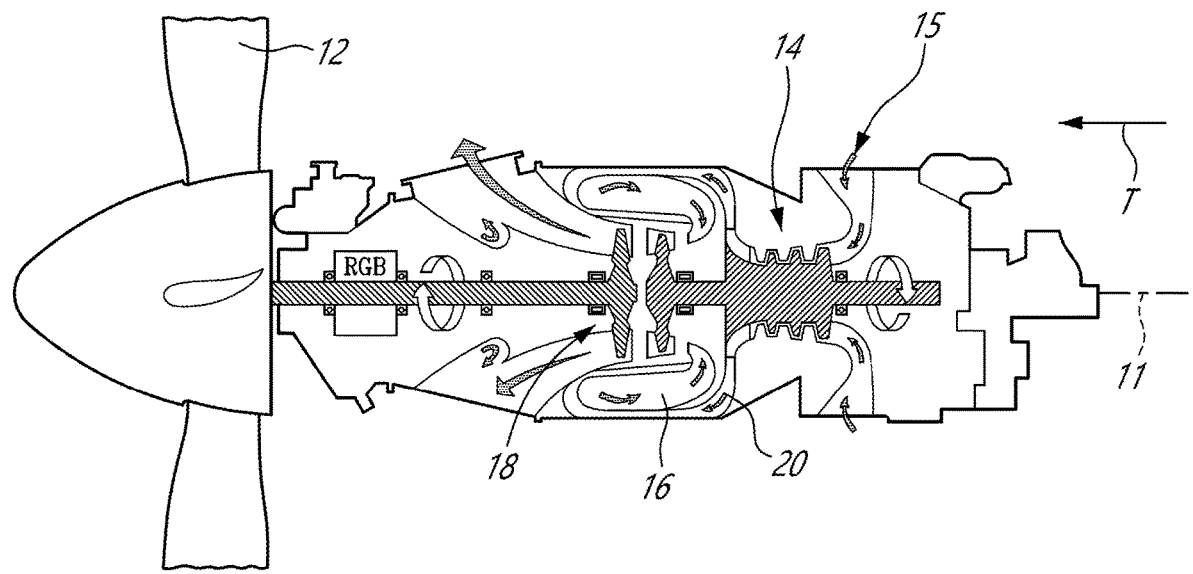
FIG. 1A is a schematic cross-sectional view of an aircraft engine depicted as a gas turbine engine.

FIG. 1A illustrates an aircraft engine depicted as a gas turbine engine 10 (in this case, a turboprop) of a type preferably provided for use in subsonic flight, and in driving engagement with a rotatable load, which is depicted as a propeller 12. The gas turbine engine has in serial flow communication a compressor section 14 for pressurizing the air, a combustor 16 in which the compressed air is mixed with fuel and ignited for generating an annular stream of hot combustion gases, and a turbine section 18 for extracting energy from the combustion gases.

It should be noted that the terms "upstream" and "downstream" used herein refer to the direction of an air/gas flow passing through an annular gaspath 20 of the gas turbine engine 10. It should also be noted that the term "axial", "radial", "angular" and "circumferential" are used with respect to a central axis 11 of the gaspath 20, which may also be a central axis of gas turbine engine 10. The gas turbine engine 10 is depicted as a reverse-flow engine in which the air flows in the annular gaspath 20 from a rear of the engine 10 to a front of the engine 10, relative to a direction of travel T of the engine 10. This is opposite than a through-flow engine in which the air flows within the gaspath in a direction opposite the direction of travel T, from the front of the engine towards the rear of the engine 10. The principles of the present disclosure can be applied to both reverse-flow and through-flow engines and to any other gas turbine engines, such as a turbofan engine and a turboprop engine.

Figure 1B:
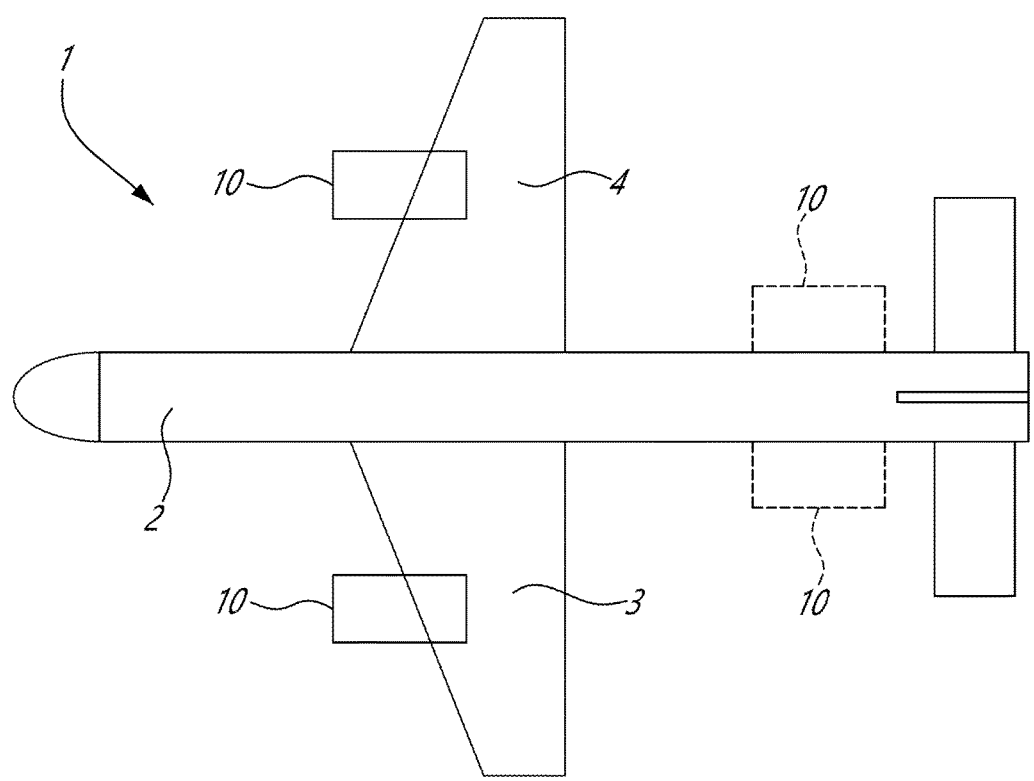
FIG. 1B is a top plan view of an aircraft equipped with two of the aircraft engines of FIG. 1A.

FIG. 1B illustrates an aircraft 1 equipped with the gas turbine engine 10 of FIG. 1A. The aircraft 1 is shown equipped with two of the gas turbine engine 10 of FIG. 1A, but may be equipped with only one, or more than two engines in other embodiments. The aircraft 1 includes a fuselage 2, a left wing 3 secured to the fuselage and a right wing 4 secured to the fuselage 2. As shown, the gas turbine engines 10 are mounted to the wings 3, 4. The gas turbine engines may alternatively be turbofan engines mounted to the fuselage 2 as depicted with dashed lines.

Figure 2:
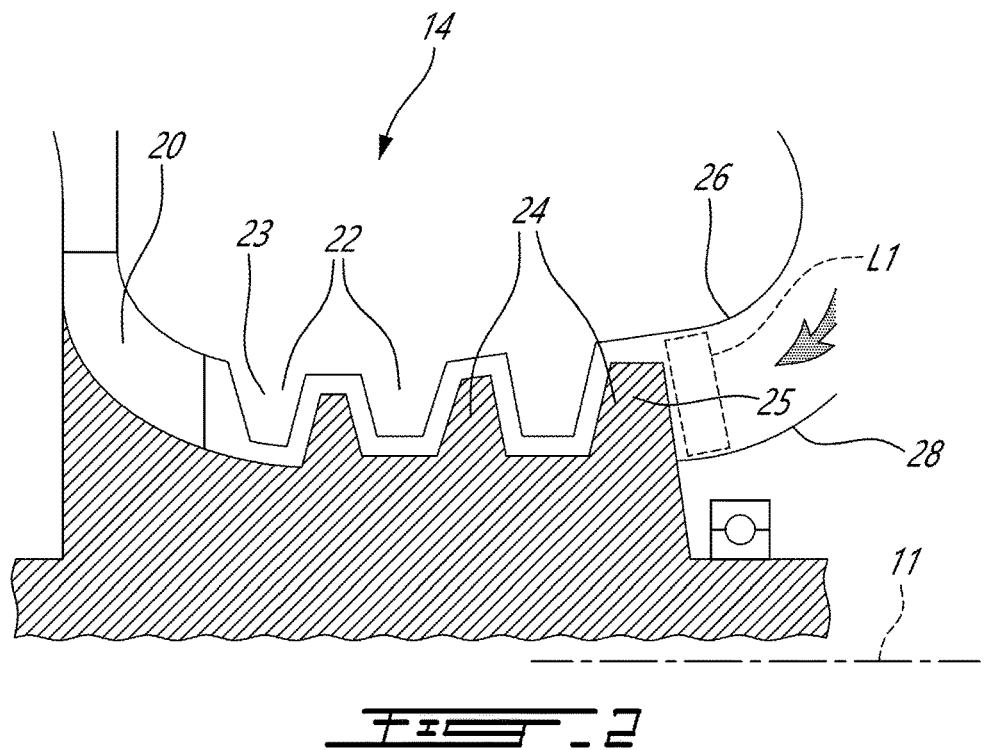
FIG. 2 is an enlarged view of a portion of FIG. 1A illustrating a compressor section of the gas turbine engine of FIG. 1A.

Referring now to FIG. 2, an enlarged view of a portion of the compressor section 14 is shown. The compressor section 14 includes a plurality of stages, namely three in the embodiment shown although more or less than three stages is contemplated, each stage including a stator 22 and a rotor 24. The rotors 24 are rotatable relative to the stators 22 about the central axis 11. Each of the stators 22 includes a plurality of vanes 23 circumferentially distributed about the central axis 11 and extending into the gaspath 20. Each of the rotors 24 also includes a plurality of blades 25 circumferentially distributed around the central axis 11 and extending into the gaspath 20, the rotors 24 and thus the blades 25 thereof rotating about the central axis 11. As will be seen in further detail below, at least one of the stators 22 includes vanes 23 which are variable guide vanes (VGVs) and thus includes a variable guide vane assembly as will be described.

In the depicted embodiment, the gaspath 20 is defined radially between an outer wall or casing 26 and an inner wall or casing 28. The vanes 23 and the blades 25 extend radially relative to the central axis 11 between the outer and inner casings 26, 28. "Extending radially" as used herein does not necessarily imply extending perfectly radially along a ray perfectly perpendicular to the central axis 11, but is intended to encompass a direction of extension that has a radial component relative to the central axis 11. The vanes 23 can be fixed orientation or variable orientation guide vanes (referred hereinafter as VGVs). Examples of rotors include fans, compressor rotors (e.g. impellers), and turbine rotors (e.g. those downstream of the combustion chamber). Other orientations of the vanes (e.g., axial) are contemplated.

Although illustrated as a turboprop engine, the gas turbine engine 10 may alternatively be another type of engine, for example a turbofan engine or a turboshaft engine, also generally comprising in serial flow communication a compressor section, a combustor, and a turbine section, and a fan through which ambient air is propelled.

Figure 3:
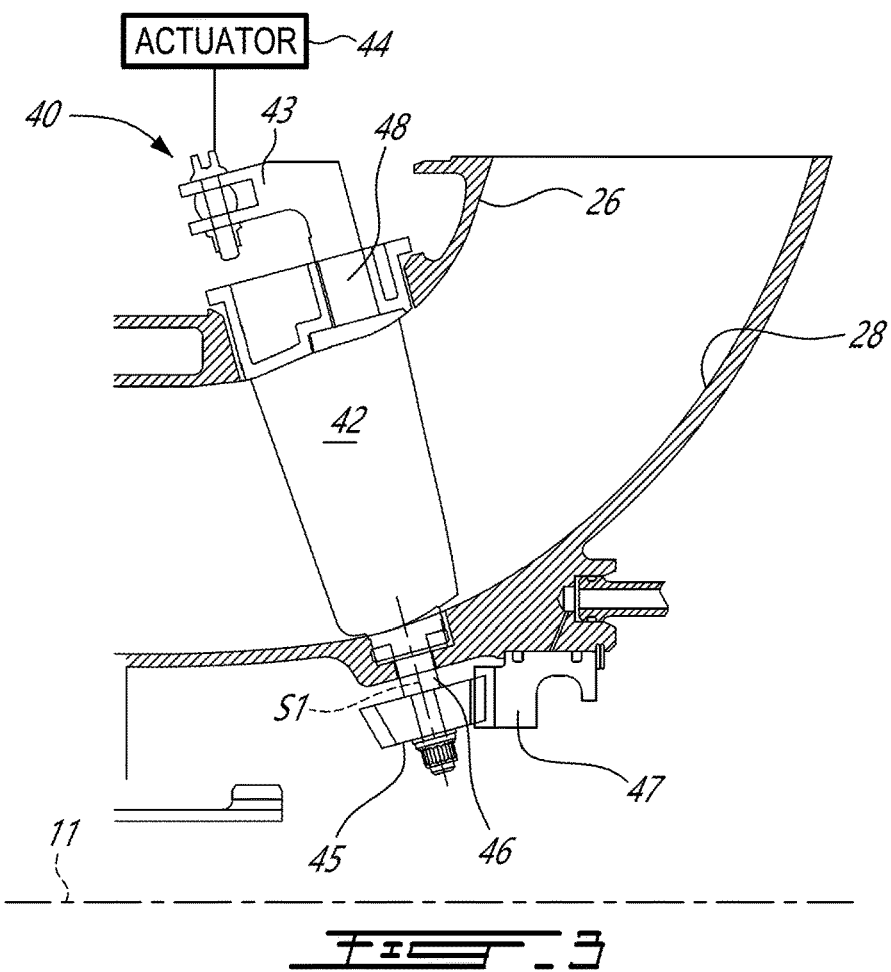
FIG. 3 is a cross-sectional view illustrating a variable guide vane assembly of the gas turbine engine of FIG. 1A located upstream of the compressor section of FIG. 2.

Referring to FIG. 3, an example of a variable guide vane (VGV) assembly of a stator 22 of the engine 10 is shown at 40. Any of the stators 22 of the compressor section 14 depicted in FIG. 2 may be embodied as a variable guide vane (VGV) assembly 40. It will be appreciated that, in some cases, the VGV assembly 40 may be used as a stator of the turbine section 18 of the engine 10 without departing from the scope of the present disclosure. The VGV assembly 40 may be located at an upstream most location L1 (FIG. 2) of the compressor section 14. That is, the VGV assembly 40 may be a variable inlet guide vane assembly.

The VGV assembly 40 includes a plurality of guide vanes 42 circumferentially distributed about the central axis 11 and extending radially between the inner casing 28 and the outer casing 26. In the present embodiment, the guide vanes 42 are rotatably supported at both of their ends by the inner casing 28 and the outer casing 26. Particularly, each of the guide vanes 42 has an airfoil having a leading edge and a trailing edge both extending along a span of the airfoil. Each of the guide vanes 42 has an inner stem 46, also referred to as an inner shaft portion, secured to an inner end of the airfoil and an outer stem 48, also referred to as an outer shaft portion, secured to an outer end of the airfoil. The guide vanes 42 are rotatable about respective spanwise axes S1. One of the guide vanes 42, which may be referred to as a master guide vane, has its outer stem 48 engaged by a vane arm 43, which is itself drivingly engaged by an actuator 44 for pivoting the master vane about it spanwise axis S1. In the present embodiment, the vanes have gears 45 secured to the inner stems 46. The gears 45 are meshed with a unison gear 47, which is rollingly engaged to the inner casing 28. Upon rotation of the master vane about its spanwise axis S1 via the actuator 44 engaged to the vane arm 43, the gear 45 of the master vane rotates thereby induces rotation of the unison gear 47, which extends annularly around the central axis 11. Rotation of the unison gear 47 induces rotation of each of the other gears 45 and, consequently, of the other guide vanes 42, which may be referred to as slave vanes, about their respective spanwise axes S1. Therefore, the unison gear 47 ensures that the rotation of all the guide vanes 42 is synchronized. Any suitable means for rotating the guide vanes 42 about their respective spanwise axes S1 are contemplated. The unison gear 47 may be located radially outwardly of the outer casing 26 in another embodiment.

The unison gear may be replaced by any suitable unison member without departing from the scope of the present disclosure.

The variable guide vane assembly 40 is used to properly orient the flow before it meets blades of a rotor located downstream of the variable guide vane assembly 40. Put differently, the flow is redirected by the variable guide vane assembly 40 so that an incidence angle between the flow and the downstream blades is optimal. This incidence angle varies with operating parameters of the gas turbine engine 10. Namely, flight parameters, such as altitude, airspeed, air temperature, and engine parameters, such as power and speed, are expected to influence the incidence angle at which the flow should meet the blades.

A control system may be used to continuously adjust a geometric angle of the guide vanes 42 as a function of those parameters. The geometric angle is defined between the guide vanes 42, namely their chord lines, and the central axis 11 of the gas turbine engine 10. The control system may be supplied with the various parameters and compute a target angle for the guide vanes 42. The control system then modulates the rotation of the guide vanes 42 and a sensor sends a signal to the control system; the signal indicative of the geometric angle of the guide vanes 42. The control system continues to module the rotation of the guide vanes 42 until the signal provided by the sensor is indicative that the geometric angle of the guide vanes 42 corresponds to the target angle.

Referring now to FIG. 4A, in some conditions, an incoming airflow F0 extends along a direction that is devoid of a circumferential component relative to the central axis 11 of the gas turbine engine 10. The guide vanes 42 deviates the flow and an outgoing airflow F1 exits flow passages defined between the guide vanes 42 along a direction that comprises a circumferential component relative to the central axis 11. In this case, a difference between a geometric angle T1 of the guide vanes 42, which is an angle defined between the central axis 11 and a chord line CL of the guide vanes 42, and an exit flow angle T2, which is an angle defined between the central axis 11 and a direction of the outgoing airflow F1, is expected to be known or at least be considered constant for a given flow velocity and density.

Referring now to FIG. 4B, it has been observed that, in some cases, the incoming airflow F0' may extend along a direction defining a swirl angle T3. The swirl angle T3 is defined between the direction of the incoming airflow F0' and the central axis 11. The swirl angle T3 represents a circumferential component of the incoming airflow F0' and may be caused by inlet flow distortion and other parameters as will be discussed below. The swirl angle F3 may affect the compressor operating line. The guide vanes 42 may at least partially alleviate this swirl angle T3 by redirecting the flow in the desirable direction, but might not be sufficient to totally cancel the swirl angle T3. In some cases, a sever inlet flow distortion may be sufficient to alter the compressor stability and efficiency. It has been observed that the swirl angle T3 has for effect of decreasing the exit flow angle T2' compared to the exit flow angle T2 of the configuration of FIG. 4A where the incoming flow F0 is devoid of a swirl angle. Thus, for the same geometric angle T1 of the guide vanes 42, the exit flow angle T2 of the configuration of FIG. 4A where no swirl angle is present may differ from the exit flow angle T2' of the configuration of FIG. 4B where the incoming airflow F0' present the swirl angle T3. A relation between the geometric angle T1 and the exit flow angle T2' where the incoming flow F0' presents the swirl angle T3 may vary with many parameters.

Typical variable guide vane control systems target a given geometric angle T1, which is scheduled in function of one or more engine parameters, such as power and/or corrected compressor speed for instance. The approach consists of anticipating the maximum compressor stability margin loss associated to the highest possible encountered inlet flow distortion during the engine operation. This approach does not take into consideration the swirl angle F3 and may result in non-optimized performance of the downstream rotor (e.g., compressor rotor). Put differently, rotating the guide vanes 42 until their geometric angle T1 matches a target geometric angle does not factor in the effect the swirl angle T3.

Referring now to FIG. 5, a control system for the variable guide vane assembly 40 is shown at 50 and may at least partially alleviate the aforementioned drawbacks.

The control system 50 aims at controlling the rotation of the variable guide vanes 42 until the exit flow angle T2' reaches a target exit flow angle. Put differently, the control system 50 focuses on the exit flow angle T2' rather than the geometric angle T1. The control system 50 takes into consideration the swirl angle T3 of the incoming flow F0' and changes the geometric angle T1 until a predicted exit flow angle reaches the target exit flow angle.

The control system 50 includes a controller 51 operatively connected to the actuator 44 and to a sensor 52 operable to send a signal to the controller 51; the signal indicative of the geometric angle T1 of the guide vanes 42. The controller 51 includes a target angle calculator 53 and an exit flow angle predictor 54. The controller 51 receives operating parameters 55, which includes one or more of flight parameters 55A and engine parameters 55B. The flight parameters includes one or more of an altitude of the aircraft 1 (FIG. 1) equipped with the gas turbine engine 10, an airspeed of the aircraft 1, a temperature of ambient air, and so on. The engine parameters 55B includes one or more of a power generated by the gas turbine engine 10, a rotational speed of the gas turbine engine 10, and so on. The controller 51 feeds the one or more of the flight parameters 55A and the engine parameters 55B to the target angle calculator 53 that computes a target exit flow angle as a function of one or more of the flight parameters 55A and the engine parameters 55B. The target exit flow angle is defined between a direction of the flow exiting the guide vanes 42 and the central axis 11. The target exit flow angle may correspond to an angle at which the flow exiting the guide vanes 42 should meet a compressor face of a downstream rotor of the compressor section 14. This angle may be computed to yield the maximum efficiency of the downstream rotor. The compressor face may be defined by leading edges of blades of rotor located downstream of the VGV assembly 40.

As shown in FIG. 6A, the target exit flow angle may be determined from a lookup table that correlates target exit flow angle values with operating parameter values, more specifically, with one or more of flight parameter values and engine parameter values. The target angle calculator 53 may receive the one or more of the flight parameter values and the engine parameter values from the controller 51, either inputted manually by a pilot, provided by one or more sensors, and so on. Based on these parameters, the target angle calculator 53 may interpolate within the lookup table of FIG. 6A to determine the target exit flow angle at which the flow exiting the guide vanes 42, namely exiting flow passages defined between the guide vanes 42, should meet the compressor face.

Referring back to FIG. 5, as aforementioned, the relation between the geometric angle T1 of the guide vanes 42 and the exit flow angle is not straightforward. Consequently, the controller 51 feeds at least the geometric angle T1 to the exit flow angle predictor 54 that determines a predicted exit flow angle as a function of at least the geometric angle T1. The predicted exit flow angle corresponds to a prediction or an estimate of the angle at which the outgoing flow is expected to exit the guide vanes 42. In the embodiment shown, the exit flow angle predictor 54 determines the predicted exit flow angle as a function of at least the geometric angle T1 and as a function of the operating parameters 55 of the gas turbine engine 10. The operating parameters 55 may include one or more of the flight parameters 55A, the engine parameters 55B, and aircraft parameters 55C.

The aircraft parameters 55C may include, for instance, a spatial orientation of the aircraft such as a yaw angle, a pitch angle, and a roll angle. The aircraft parameters 55C may further include information regarding an inlet of the gas turbine engine 10. For instance, if the gas turbine engine 10 is a turbofan, the swirl angle T3 is expected to be minimal. However, if the gas turbine engine 10 is a turboprop as illustrated in FIG. 1, the air entering an inlet 15 is deviated from being oriented substantially radially to being oriented substantially axial as it meets the VGV assembly 40. In some cases, the gas turbine engine 10 may be an auxiliary power unit (APU) and the inlet may be S-duct. The air then navigates through a series of elbows before reaching the VGV assembly 40. A filter may be provided upstream of the VGV assembly 40. A scoop may be used to drawn air from an environment into the gas turbine engine 10. The aircraft parameters may further includes information regarding the position of the gas turbine engine 10. For instance, and as depicted in FIG. 1B, the gas turbine engine 10 may be mounted on a right wing, on a left wing, on a right side of a fuselage, on a left side of the fuselage, on a top of the fuselage, within a tail of the aircraft, and so on. All of these different configurations are expected to create distortion into the incoming flow F0' and affect the swirl angle T3. The distortion may thus be regarded as a non-asymmetry of a velocity/pressure field of the air as it meets the VGV assembly 40.

The exit flow angle predictor 54 is able to provide a prediction of the exit flow angle T2' at which the outgoing flow F1' is expected to meet the compressor face. As illustrated in FIG. 6B, the exit flow angle predictor 54 may comprise a lookup table correlating predicted exit flow angle values with geometric angle values and operating parameter values, such as one or more of flight parameter values, engine parameter values, aircraft parameter values. The lookup table may include one or more multidimensional tables. The values of the lookup table of FIG. 6B may be generated by experimental testing and/or by computational fluid dynamics (CFD) simulations. For instance, for each possible permutations of the geometric angle T1 of the guide vanes 42, the flight parameters 55A, the engine parameters 55B, and the aircraft parameters 55C, a simulation, either experimental or numerical, is performed to compute the resulting exit flow angle. These values are tabulated and the exit flow angle predictor 54 may be able to interpolate to output the predicted exit flow angle. In an alternate embodiment, the exit flow angle predictor 54 may comprise a linearized model using partial derivate or an embarked full CFD model that may be solved in real-time.

Referring back to FIGS. 5 and 5A, in use, the engine parameters 55B and the flight parameters 55A are fed to the target angle calculator 53 that outputs a target exit flow angle at which the outgoing flow F1' should meet the compressor face. The exit flow angle predictor 54 receives the geometric angle T1, which may be supplied by the sensor 52, and, in some embodiments, one or more of the flight parameters 55A, the engine parameters 55B, and the aircraft parameters 55C, and outputs the predicted exit flow angle. If the predicted exit flow angle differs from the target exit flow angle outputted by the target angle calculator 53, the controller 51 sends a signal to the actuator 44 to pivot the guide vanes 42 about their spanwise axes S1. This process continues until the predicted exit flow angle is sufficiently close the target exit flow angle. A control gain may be supplied for operation of the actuator 44.

Figure 7:
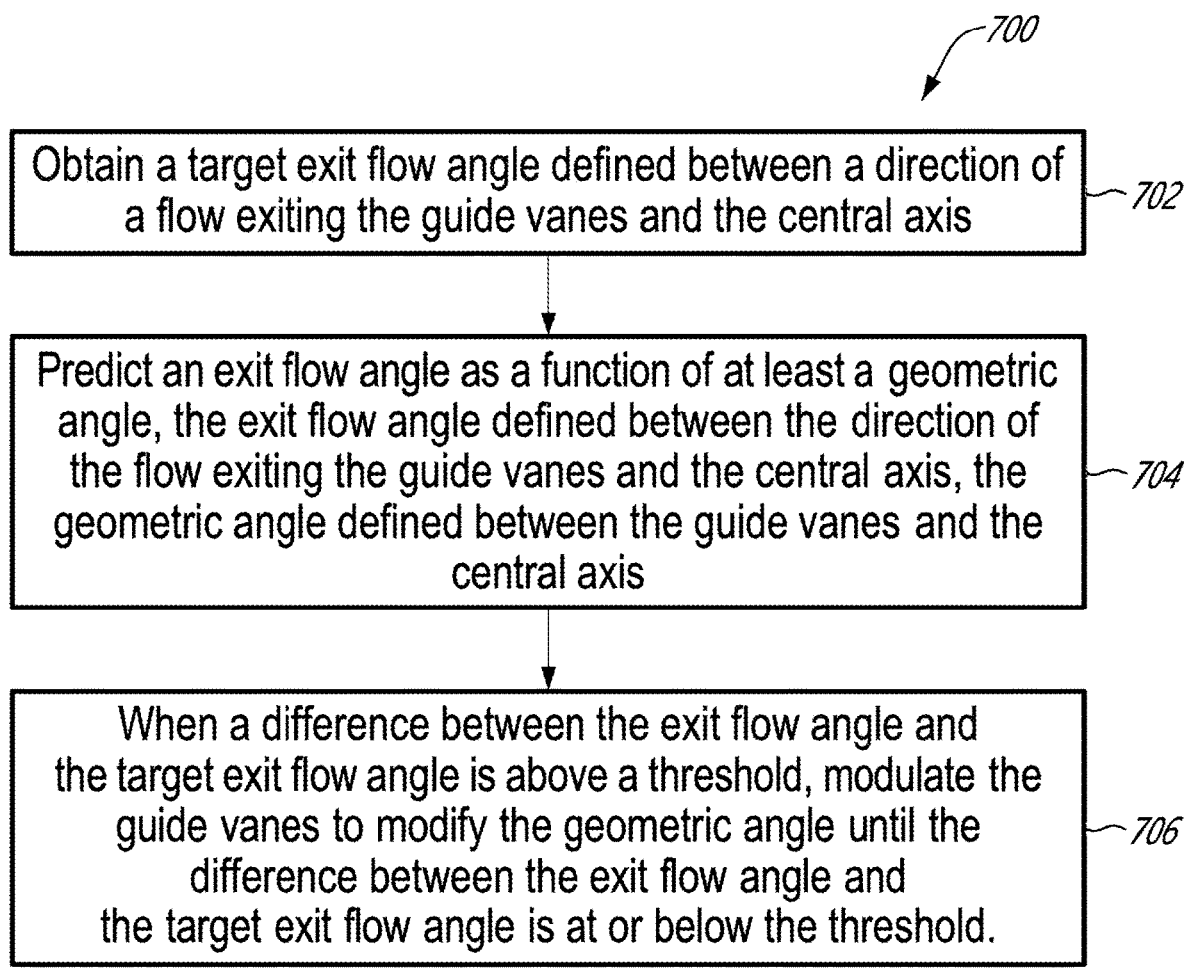
FIG. 7 is a flowchart illustrating steps of operating the variable guide vane assembly of FIG. 3.

Referring now to FIG. 7, a method of operating the variable guide vane assembly of FIG. 3 is shown at 700. The method 700 includes obtaining the target exit flow angle defined between the direction of a flow exiting the guide vanes 42 and the central axis 11 at 702; predicting the exit flow angle as a function of at least the geometric angle T1 at 704; and when a difference between the exit flow angle and the target exit flow angle is above a threshold, modulating the guide vanes 42 to modify the geometric angle T1 until the difference between the exit flow angle and the target exit flow angle is below the threshold at 706. This threshold may be from 0 to +1-5 degrees for instance.

In the embodiment shown, the predicting of the exit flow angle as a function of the at least the geometric angle includes determining the exit flow angle as a function of at least the geometric angle and as a function of operating parameters of the aircraft engine. As aforementioned, the operating parameters include aircraft parameters including one or more of a spatial orientation of the aircraft engine, a location of the aircraft engine in relation to an aircraft equipped with the aircraft engine, and a configuration of an inlet of the aircraft engine. The operating parameters may include engine parameters including one or more of a power output of the aircraft engine and a rotational speed of a shaft of the aircraft engine. The operating parameters may include flight parameters including one or more of an altitude of the aircraft engine, an airspeed of the aircraft engine, and a temperature of air entering the aircraft engine.

In the present embodiment, the predicting of the exit flow angle includes obtaining the exit flow angle from the lookup table of FIG. 6B. This table correlates geometric angle values and operating parameters values with exit flow angles values.

The modulating of the guide vanes 42 to modify the geometric angle T1 may be an iterative process. This process may include: a) causing rotation of the guide vanes 42 from a first position to a second position; b) determining an updated geometric angle of the guide vanes 42 at the second position; c) determining, based on at least the updated geometric angle of the guide vanes, an updated exit flow angle; and d) repeating steps a) to c) if a difference between the target exit flow angle and the updated exit flow angle is greater than the threshold until the difference is less than the threshold.

As mentioned above, the obtaining of the target exit flow angle may include determining the target exit flow angle as a function of operating parameters of the aircraft engine. The operating parameters include one or more of engine parameters and flight parameters, the engine parameters including one or more of a power output of the aircraft engine and a rotational speed of a shaft of the aircraft engine, the flight parameters including one or more of an altitude of the aircraft engine, an airspeed of the aircraft engine, and a temperature of air entering the aircraft engine. The determining of the target exit flow angle may include determining the target exit flow angle from the lookup table of FIG. 6A that correlates operating parameters values with target exit flow angles values.

The present disclosure may provide a system and method to mitigate the negative impact of the distortion induced swirl flow angle. The proposed approach consists of including into the control loop a predictor of the flow angle at the compressor face, namely the "effective guided vane angle" or the "predicted exit flow angle". Rather than controlling a "geometric guided vane angle" as done in the traditional method, the proposed method controls the exit flow angle. For any type of possible engine inlet flow distortion encountered, the disclosed control system may allow the commanded geometric actuation angle to match the desirable effective flow swirl angle in front of the compressor face.

Figure 8:
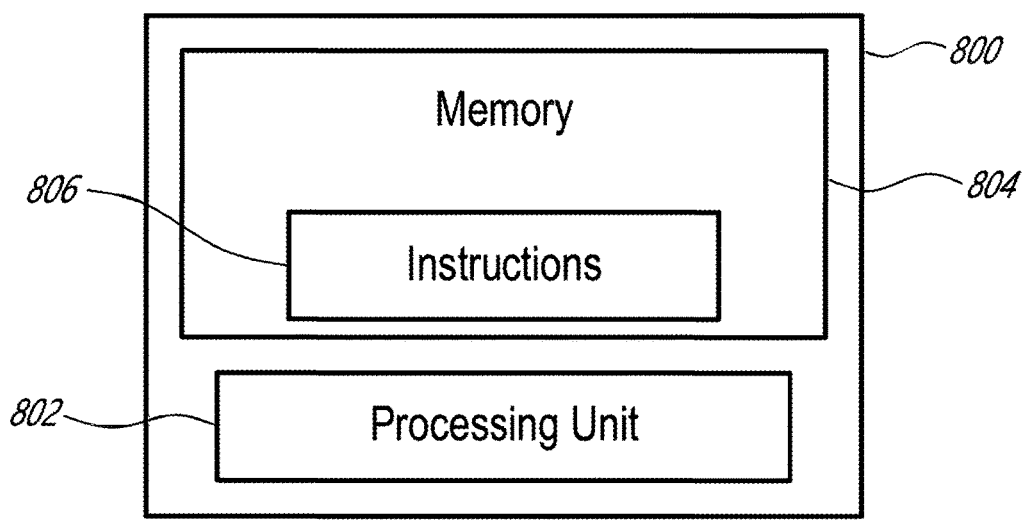
FIG. 8 is a schematic view of a controller in accordance with one embodiment.

With reference to FIG. 8, an example of a computing device 800 is illustrated. For simplicity only one computing device 800 is shown but the system may include more computing devices 800 operable to exchange data. The computing devices 800 may be the same or different types of devices. The controller 51 may be implemented with one or more computing devices 800. Note that the controller 51 can be implemented as part of a full-authority digital engine controls (FADEC) or other similar device, including electronic engine control (EEC), engine control unit (ECU), electronic propeller control, propeller control unit, and the like. In some embodiments, the controller 51 is implemented as a Flight Data Acquisition Storage and Transmission system, such as a FAST™ system. The controller 51 may be implemented in part in the FAST™ system and in part in the EEC. Other embodiments may also apply.

The computing device 800 comprises a processing unit 802 and a memory 804 which has stored therein computer-executable instructions 806. The processing unit 802 may comprise any suitable devices configured to implement the method 700 such that instructions 806, when executed by the computing device 800 or other programmable apparatus, may cause the functions/acts/steps performed as part of the method 700 as described herein to be executed. The processing unit 802 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 804 may comprise any suitable known or other machine-readable storage medium. The memory 804 may comprise non-transitory computer readable storage medium, for example, but not limited to, an electronic, magnetic, optical, electromagnetic, infrared, or semiconductor system, apparatus, or device, or any suitable combination of the foregoing. The memory 804 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 804 may comprise any storage means (e.g., devices) suitable for retrievably storing machine-readable instructions 806 executable by processing unit 802.

The methods and systems for operating the variable guide vane assembly 40 described herein may be implemented in a high level procedural or object oriented programming or scripting language, or a combination thereof, to communicate with or assist in the operation of a computer system, for example the computing device 800. Alternatively, the methods and systems for operating the variable guide vane assembly 40 may be implemented in assembly or machine language. The language may be a compiled or interpreted language. Program code for implementing the methods and systems for operating the variable guide vane assembly 40 may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating the variable guide vane assembly 40 may also be considered to be implemented by way of a non-transitory computer-readable storage medium having a computer program stored thereon. The computer program may comprise computer-readable instructions which cause a computer, or more specifically the processing unit 802 of the computing device 800, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of operating a variable guide vane assembly of an aircraft engine, the variable guide vane assembly including guide vanes rotatable about respective spanwise axes and circumferentially distributed about a central axis, the method comprising:
 obtaining a target exit flow angle defined between a direction of a flow exiting the guide vanes and the central axis;
 predicting an exit flow angle as a function of at least a geometric angle, the exit flow angle defined between the direction of the flow exiting the guide vanes and the central axis, the geometric angle defined between the guide vanes and the central axis; and
 in response to a difference between the exit flow angle and the target exit flow angle is being above a threshold, modulating the guide vanes to modify the geometric angle until the difference between the exit flow angle and the target exit flow angle is at or below the threshold.

2. The method of claim 1, wherein the predicting of the exit flow angle as a function of the at least the geometric angle includes determining the exit flow angle as a function of at least the geometric angle and as a function of operating parameters of the aircraft engine.

3. The method of claim 2, wherein the operating parameters include aircraft parameters including one or more of a spatial orientation of the aircraft engine, a location of the aircraft engine in relation to an aircraft equipped with the aircraft engine, and a configuration of an inlet of the aircraft engine.

4. The method of claim 2, wherein the operating parameters include engine parameters including one or more of a power output of the aircraft engine and a rotational speed of a shaft of the aircraft engine.

5. The method of claim 2, wherein the operating parameters include flight parameters including one or more of an altitude of the aircraft engine, an airspeed of the aircraft engine, and a temperature of air entering the aircraft engine.

6. The method of claim 2, wherein the predicting of the exit flow angle includes obtaining the exit flow angle from a lookup table correlating geometric angle values and operating parameters values with exit flow angles values.

7. The method of claim 1, wherein the modulating of the guide vanes to modify the geometric angle includes:
 a) causing rotation of the guide vanes from a first position to a second position;
 b) determining an updated geometric angle of the guide vanes at the second position;
 c) determining, based on at least the updated geometric angle of the guide vanes, an updated exit flow angle;

d) repeating steps a) to c) in response to a difference between the target exit flow angle and the updated exit flow angle being greater than the threshold until the difference is less than the threshold.

8. The method of claim 1, wherein the obtaining of the target exit flow angle includes determining the target exit flow angle as a function of operating parameters of the aircraft engine.

9. The method of claim 8, wherein the operating parameters include one or more of engine parameters and flight parameters, the engine parameters including one or more of a power output of the aircraft engine and a rotational speed of a shaft of the aircraft engine, the flight parameters including one or more of an altitude of the aircraft engine, an airspeed of the aircraft engine, and a temperature of air entering the aircraft engine.

10. The method of claim 8, wherein the determining of the target exit flow angle includes determining the target exit flow angle from a lookup table correlating operating parameters values with target exit flow angles values.

11. An aircraft engine comprising:
a variable guide vane assembly including guide vanes rotatable about respective spanwise axes and circumferentially distributed about a central axis;
an actuator drivingly engaged to the guide vanes for rotating the guide vanes about the respective spanwise axes;
a sensor operable to send a signal indicative of a geometric angle of the guide vanes, the geometric angle defined between the guide vanes and the central axis; and
a controller operatively connected to the actuator and to the sensor, the controller having a processing unit and a computer-readable medium operatively connected to the processing unit and having instructions stored thereon configured to cause the processing unit to:
obtain a target exit flow angle defined between a direction of a flow exiting the guide vanes and the central axis;
predicting an exit flow angle as a function of at least a geometric angle, the exit flow angle defined between the direction of the flow exiting the guide vanes and the central axis, the geometric angle determined based on the signal from the sensor; and
when a difference between the exit flow angle and the target exit flow angle is above a threshold, power the actuator to modulate the guide vanes to modify the geometric angle until the difference between the predicted exit flow angle and the target exit flow angle is at or below the threshold.

12. The aircraft engine of claim 11, wherein the instructions are configured to cause the processing unit to predict the exit flow angle as a function of the at least the geometric angle by causing the processing unit to determine the exit flow angle as a function of at least the geometric angle and as a function of operating parameters of the aircraft engine.

13. The aircraft engine of claim 12, wherein the operating parameters include aircraft parameters including one or more of a spatial orientation of the aircraft engine, a location of the aircraft engine in relation to an aircraft equipped with the aircraft engine, and a configuration of an inlet of the aircraft engine.

14. The aircraft engine of claim 12, wherein the operating parameters include engine parameters including one or more of a power output of the aircraft engine and a rotational speed of a shaft of the aircraft engine.

15. The aircraft engine of claim 12, wherein the operating parameters include flight parameters including one or more of an altitude of the aircraft engine, an airspeed of the aircraft engine, and a temperature of air entering the aircraft engine.

16. The aircraft engine of claim 12, wherein the instructions are configured to cause the processing unit to determine the exit flow angle by causing the processing unit to obtain the exit flow angle from a lookup table correlating geometric angle values and operating parameters values with exit flow angles values.

17. The aircraft engine of claim 11, wherein the instructions are configured to cause the processing unit to the modulate the guide vanes to modify the geometric angle by causing the processing unit to:
a) cause rotation of the guide vanes from a first position to a second position;
b) determine an updated geometric angle of the guide vanes at the second position;
c) determine, based on at least the updated geometric angle of the guide vanes, an updated exit flow angle;
d) repeat steps a) to c) if a difference between the target exit flow angle and the updated exit flow angle is greater than the threshold until the difference is less than the threshold.

18. The aircraft engine of claim 11, wherein the instructions are configured to cause the processing unit to obtain the target exit flow angle by causing the processing unit to determine the target exit flow angle as a function of operating parameters of the aircraft engine.

19. The aircraft engine of claim 18, wherein the operating parameters include one or more of engine parameters and flight parameters, the engine parameters including one or more of a power output of the aircraft engine and a rotational speed of a shaft of the aircraft engine, the flight parameters including one or more of an altitude of the aircraft engine, an airspeed of the aircraft engine, and a temperature of air entering the aircraft engine.

20. The aircraft engine of claim 18, wherein the instructions are configured to cause the processing unit to determine the target exit flow angle by causing the processing unit to determine the target exit flow angle from a lookup table correlating operating parameters values with target exit flow angles values.

* * * * *